US012799271B2

(12) United States Patent
Kim et al.

(10) Patent No.: US 12,799,271 B2
(45) Date of Patent: Nov. 17, 2026

(54) POLYESTER MOLDED BODY AND METHOD FOR MANUFACTURING SAME

(71) Applicant: HYOSUNG TNC CORPORATION, Seoul (KR)

(72) Inventors: Chon Ki Kim, Incheon (KR); Mee So Park, Daejeon (KR); Moo Song Kim, Gyeonggi-do (KR)

(73) Assignee: HYOSUNG TNC CORPORATION, Seoul (KR)

( * ) Notice: Subject to any disclaimer, the term of this patent is extended or adjusted under 35 U.S.C. 154(b) by 766 days.

(21) Appl. No.: 18/041,841

(22) PCT Filed: Aug. 18, 2021

(86) PCT No.: PCT/KR2021/010935
§ 371 (c)(1),
(2) Date: Feb. 16, 2023

(87) PCT Pub. No.: WO2022/039484
PCT Pub. Date: Feb. 24, 2022

(65) Prior Publication Data

US 2023/0312816 A1 Oct. 5, 2023

(30) Foreign Application Priority Data

Aug. 19, 2020 (KR) ........................ 10-2020-0103817

(51) Int. Cl.
*C08G 63/85* (2006.01)
*C08G 63/183* (2006.01)

(52) U.S. Cl.
CPC ........... *C08G 63/183* (2013.01); *C08G 63/85* (2013.01)

(58) Field of Classification Search
CPC .............................. C08G 63/183; C08G 63/85
USPC .......................................................... 528/283
See application file for complete search history.

(56) References Cited

U.S. PATENT DOCUMENTS

2008/0260979 A1* 10/2008 Yokoyama ........... C08G 63/785
528/271

FOREIGN PATENT DOCUMENTS

| | | |
|---|---|---|
| JP | 2008-001847 | 1/2008 |
| JP | 2018-090673 | 6/2018 |
| KR | 10-0193303 B | 6/1999 |
| KR | 10-2001-0043209 | 5/2001 |
| KR | 10-2010-0020223 | 2/2010 |
| KR | 10-2016-0088292 | 7/2016 |
| KR | 10-2019-0128157 | 11/2019 |

OTHER PUBLICATIONS

Nagahata et al., JP 2008-001847 A machine translation in English, Jan. 10, 2008. (Year: 2008).*
Hansen, et al., "Mass spectrometric identification and characterization of antimony complexes with ribose-containing biomolecules and an RNA oligomer", Anal Bioanal Chem (2006) 385: 821-833.
International Search Report issued in International Application No. PCT/KR2021/010935, Dec. 6, 2021, 5 pages w/translation.
Written Opinion issued in International Application No. PCT/KR2021/010935, Dec. 6, 2021, 4 pages.
First Office Action issued in Taiwanese Patent Application No. 110130569, Apr. 1, 2022, 5 pages.
Second Office Action issued in Taiwanese Patent Application No. 110130569, Oct. 28, 2022, 4 pages.

* cited by examiner

*Primary Examiner* — David T Karst
(74) *Attorney, Agent, or Firm* — HSML P.C.

(57) ABSTRACT

The present invention relates to a polyester molded body and a method for manufacturing the same, the polyester molded body including polyester obtained by polymerization in the presence of an inorganic tin compound catalyst, wherein the polyester molded body containing an inorganic tin compound of the present invention may overcome problems caused by a residual antimony-based catalyst, and may be used as an eco-friendly container which does not affect taste and aroma when used as a food storage container due to reduced amounts of acetaldehyde and formaldehyde and which is not toxic to the human body.

6 Claims, No Drawings

POLYESTER MOLDED BODY AND METHOD FOR MANUFACTURING SAME

TECHNICAL FIELD

The present invention relates to a polyester molded body and a manufacturing method of the polyester molded body, and more specifically, to an environmentally friendly polyester molded body in which problems caused by a residual antimony-based catalyst are solved, and a manufacturing method of the polyester molded body.

BACKGROUND ART

In general, polyester has excellent mechanical properties and chemical properties, and thus has been used for various purposes, for example, beverage filling containers, automotive molded articles, and the like. However, during the process of polycondensing polyester, acetaldehyde and formaldehyde are produced as adducts, which may be harmful if consumed through products containing the acetaldehyde and formaldehyde. In particular, acetaldehyde present in a beverage bottle slowly leaks out and is mixed with the contents, thereby negatively affecting the flavor and aroma of a product consumed. In addition, formaldehyde present in a bottle is a toxic substance which causes diseases such as cancer in vivo even with a trace amount thereof, and thus is strictly regulated in developed countries. Therefore, many studies have been conducted in order to suppress the generation of aldehyde-based substances such as acetaldehyde and formaldehyde which are formed in the polycondensation process of polyester.

In addition, in the case of disposing of a polyester molded body after use by incineration, it is preferable that the content of a metal which becomes the source of generating ash that requires additional processing is small. In addition, even in the case of recovering and reusing a monomer by depolymerizing a polyester resin after use, it is preferable that the content of a metal which is the source of impurities in the recovered monomer is small. Therefore, there is an urgent need to develop a technology for reducing the content of a metal, particularly a heavy metal, contained in a polyester resin which is used as the material for a polyester molded body.

An antimony-based catalyst is a representative material for polycondensing polyester used for the manufacturing of a molded body such as a beverage bottle. However, in the case of a polyester food container manufactured using an antimony-based catalyst, large amounts of acetaldehyde and formaldehyde are produced as adducts during a polycondensation process. As an example, Korean Patent Laid-Open Publication No. 2001-0043209 discloses a technology for preparing a polyester resin of a polyester molded body by polymerization under an antimony compound catalyst. However, in the case of a molded body such as a beverage bottle made of an antimony-based catalyst, a large amount of antimony is required to be used in a polymerization process, and since the metal itself is toxic, when used for a long period of time, antimony is leaked and introduced into a living body, causing diseases such as fetal growth inhibition and carcinogenicity and causing environmental problems (Anal. Bioanal. Chem. 2006, 385, 821). In addition, since an antimony catalyst does not have high polymerization activity per metal weight, it is necessary to use the antimony catalyst at a relatively high concentration when producing a polyester resin at a production rate that is industrially satisfactory. As a result, the polyester resin produced using such a compound contains 50 ppm to 300 ppm of antimony as a metal atom. In addition, when the antimony catalyst is used in a polyester polymerization reaction, a reduced catalyst material is generated at about 10% to 15% with respect to an input amount of the antimony catalyst, which may cause a problem in that the L value of a color of a polyester molded body is lowered.

Despite attempts to apply an antimony-free-based catalyst such as a titanium-based or aluminum-based catalyst, the problem of generation of acetaldehyde and formaldehyde during a polycondensation or product molding process still remains a serious problem. Korean Patent Publication No. 2010-0020223 discloses a multi-layered polyester resin molded body including a surface layer composed of polyethylene terephthalate containing a metal-based catalyst selected from the group consisting of a germanium-based catalyst, a titanium-based catalyst, and a mixture thereof, and a rear layer composed of polyethylene terephthalate containing an antimony-based catalyst. However, the titanium-based catalyst has high polycondensation activity per metal weight, but also has a strong tendency to cause an undesirable polyester decomposition reaction, and has a problem of causing deterioration in resin quality due to coloring of a resin during a polycondensation reaction process, or due to by-products of a low-molecular weight compound or a decrease in molecular weight in a melt-molding step, and the like. As a result, a polyester resin prepared using such a titanium compound as a polycondensation catalyst has low stability, and has greater generation of acetaldehyde or a greater decrease in molecular weight caused by thermal decomposition during the melt-molding than that of a polyester resin prepared using a typical antimony compound as a polycondensation catalyst, so that it is difficult to use the polyester resin as a material for a molded body such as a beverage filling container.

Meanwhile, although a germanium compound catalyst itself has high activity, when the amount of a germanium catalyst used for polymerization is large, the high price of the catalyst makes it difficult to commercialize the catalyst.

DISCLOSURE OF THE INVENTION

Technical Problem

The present invention is to solve the above-described problems of the prior art, and one object of the present invention is to suppress the generation of acetaldehyde and formaldehyde during a polyester polycondensation process or a product molding process as much as possible to provide an eco-friendly polyester molded body which does not affect the taste and aroma of the contents and which is not toxic to the human body.

Another object of the present invention is to provide a polyester molded body which has reduced foreign substances and which is excellent in strength and elongation, heat resistance, and shape stability.

Another object of the present invention is to provide a method for manufacturing a polyester resin molded body with reduced amounts of acetaldehyde and formaldehyde.

Technical Solution

One aspect of the present invention for solving the above-described technical problems relates to a polyester molded body in which polyester prepared using an inorganic tin compound as a polymerization catalyst is molded.

The inorganic tin compound may be an inorganic tin first compound (stannous compound) or an inorganic tin second compound (stannic compound).

Non-limiting examples of the inorganic tin first compound may include stannous oxide, stannous pyrophosphoric acid, stannous phosphoric acid, stannous tartaric acid, stannous acetic acid, stannous oxalic acid, stannous stearic acid, stannous oleic acid, stannous gluconic acid, stannous citric acid, stannous 2-ethylhexanonic acid, stannous ethoxide, stannous acetylacetonate, and stannous glycolic acid.

Non-limiting examples of the inorganic tin second compound may include stannic oxide, stannic pyrophosphoric acid, stannic phosphoric acid, stannic tartaric acid, stannic acetic acid, stannic oxalic acid, stannic stearic acid, stannic oleic acid, stannic gluconic acid, stannic citric acid, stannic 2-ethylhexanonic acid, stannic ethoxide, stannic acetylacetonate, and stannic glycolic acid.

The inorganic tin compounds may be a combination of several kinds thereof, or may be used by being mixed with a known catalyst.

The polyester molded body may include one or two or more of polyethylene terephthalate, polytrimethylene terephthalate, polytetramethylene terephthalate, and polybutylene terephthalate, and may include 10 ppm to 200 ppm of the residue of an inorganic tin compound.

Another aspect of the present invention for solving the above-described technical problems relates to a method for manufacturing a polyester molded body, the method characterized by melting and molding a polyester polymer polymerized in the presence of an inorganic tin compound catalyst.

Advantageous Effects

According to the present invention, by using a catalyst not containing heavy metals harmful to the human body and the environment, it is possible to provide a polyester molded body not containing components which cause environmental pollution and which are harmful to the human body, and to reduce the load on the environment even during an incineration or recycling process of the molded body.

The polyester molded body of the present invention may be used as an eco-friendly container which does not affect taste and aroma when used as a food storage container due to reduced aldehyde-based compounds, and which is not toxic to the human body.

The polyester molded body of the present invention has an effect of providing excellent heat resistance, dimensional stability, and molding processability.

BEST MODE FOR CARRYING OUT THE INVENTION

Hereinafter, the present invention will be described in more detail.

In describing the present invention, when it is determined that detailed descriptions of related known technologies may obscure the gist of the present invention, the detailed descriptions will be omitted. In the present specification, when a portion is said to "comprise(s)" any element (component), it means that the portion may further comprise(s) other elements rather than excluding the other elements (components), unless otherwise stated.

A polyester molded body of an embodiment of the present invention is characterized in that polyester prepared using an inorganic tin compound as a polymerization catalyst is molded.

The inorganic tin compound catalyst may be used alone, or two or more thereof may be used in combination or in combination with a typically known catalyst.

An organotin compound is excluded from the present invention because it is a material subject to strong environmental regulations compared an inorganic tin compound used in the present invention.

The inorganic tin compound used in the present invention has a low value of standard redox potential energy compared to that of an antimony (Sb) catalyst which is used in the related art, and thus has a significant advantage of not being easily reduced during a polyester polymerization reaction and a molding process. The inorganic tin compound catalyst used in the present invention does not have a problem of being easily reduced during the polymerization reaction, thereby causing degradation in activity or generation of catalyst residues in a polymerization reactor due to a reduced product, and since there is less occurrence of an increase in extruder filter pressure and generation of nozzle foreign substances during the molding process, it is possible to obtain the result of improved processibility.

| Sb (Antimony) | | | Sn (Tin) | | |
|---|---|---|---|---|---|
| Before | After | R.P.E. (V) | Before | After | R.P.E. (V) |
| 5+ | 3+ | 0.746 | 4+ | 2+ | 0.150 |
| 3+ | 0 | 0.152 | 2+ | 0 | −0.136 |
| | | | 4+ | 0 | 0.010 |

The standard redox potential energy means that the larger the value, the greater the reducibility, and the smaller the value, the lower the reducibility. Antimony (Sb), which has been mainly used in polyester polymerization in the related art, has a reducing power with a positive (+) value of standard redox potential in the state of oxidation number 3 or 5 with catalytic activity. On the other hand, the inorganic tin compound catalyst used in the present invention maintains catalytic activity because the reduction thereof in the state of oxidation number 2 is involuntary (R.P.E is a negative value), and reduced products (catalyst residues) generated during polyester polymerization and extrusion processes may be reduced.

It is particularly preferable that the inorganic tin compound is tin oxalic acid, tin acetic acid, and tin glycolic acid.

The inorganic tin compound catalyst may be an inorganic tin first compound (stannous compound) or an inorganic tin second compound (stannic compound).

The inorganic tin first compound may be selected from the group consisting of stannous oxide, stannous pyrophosphoric acid, stannous phosphoric acid, stannous tartaric acid, stannous acetic acid, stannous oxalic acid, stannous stearic acid, stannous oleic acid, stannous gluconic acid, stannous citric acid, stannous 2-ethylhexanonic acid, stannous ethoxide, stannous acetylacetonate, and stannous glycolic acid.

The inorganic tin second compound may be selected from the group consisting of stannic oxide, stannic pyrophosphoric acid, stannic phosphoric acid, stannic tartaric acid, stannic acetic acid, stannic oxalic acid, stannic stearic acid, stannic oleic acid, stannic gluconic acid, stannic citric acid, stannic 2-ethylhexanonic acid, stannic ethoxide, stannic acetylacetonate, and stannic glycolic acid.

The inorganic tin compound catalyst used in the present invention may be introduced at any stage during polyester polymerization. For example, the inorganic tin compound catalyst of the present invention may be introduced only when preparing a slurry (EG/TPA mixture) before an esterification reaction step, introduced only in the esterification reaction step, or introduced only in a polycondensation step of an esterification reactant, or introduced when preparing a slurry before an esterification reaction step, in the esterification reaction step, and in a polycondensation step. However, when polyester is prepared by an esterification reaction of a dicarboxylic acid component and a glycol component, followed by polycondensation of a reactant, it is preferable that the inorganic tin compound catalyst is added in the polycondensation step of the esterification reactant.

The inorganic tin compound catalyst may be used in both a method in which the catalyst itself is added as powder or in the form of a catalyst solution in a polyester polymerization process, and a method in which the catalyst is prepared in an ethylene glycol solution and then introduced. However, when the catalyst is prepared in an ethylene glycol solution and introduced, the catalyst may be prepared in the form of tin glycolic acid by reacting the ethylene glycol solution with the inorganic tin compound.

An antimony-based catalyst used as a typical polyester polymerization catalyst has low catalytic activity, and thus 50 ppm to 500 ppm (based on the amount of Sb element) thereof based on polyester is used. On the other hand, in the case of the inorganic tin compound catalyst newly applied in the present invention, it is possible to sufficiently secure equivalent polycondensation reactivity even with a small amount of 10 ppm to 200 ppm, preferably 10 ppm to 100 ppm (based on the amount of Sn element), of the catalyst. Due to such a low catalyst content, catalytic foreign matters of polyester are reduced, and the generation of foreign matters caused by a catalytic reduced material is reduced in a molding process, so that an effect of reducing foreign matters in the molding process may be obtained. In addition, when a catalyst is used at a high concentration, a greyish phenomenon of a polyester polymer may occur, and in the present invention, a remarkable effect of improving the color (Color L) of the polyester polymer and a molded body may be obtained due to the low catalyst content.

In addition, when the catalyst of the present invention is applied, the heat resistance of polyester may be improved to lower the content of acetaldehyde generated from a polyester decomposition product, and also, a polycondensation reaction may be performed at a low polymerization temperature to improve the content of a cyclic oligomer.

Unlike an antimony-based catalyst, the catalyst of the present invention is less likely to cause problems to humans and the environment due to the relatively low toxicity of the metal itself, and exhibits high activity within a short reaction time even with a small amount thereof. In addition, polyester manufactured using the catalyst of the present invention has excellent physical properties such as viscosity and color.

The polyester used in the polyester molded body of the present invention is homo polyester or copolymerized polyester. When the polyester is homo polyester, it is preferable to obtain the same by polycondensation of aromatic dicarbonic acid and aliphatic glycol. Examples of the aromatic dicarboxylic acid may include terephthalic acid, 2,6-naphthalene dicarboxylic acid, and the like. Examples of the aliphatic glycol may include ethylene glycol, diethylene glycol, 1,4-cyclohexanedimethanol, and the like. Preferably, the polyester is polyethylene terephthalate (PET), polybutylene terephthalate, polytrimethylene terephthalate, and polytetramethylene terephthalate.

Meanwhile, examples of a dicarboxylic acid component of the copolymerized polyester may include one or two or more of isophthalic acid, phthalic acid, terephthalic acid, 2,6-naphthalenedicarboxylic acid, adipic acid, sebacic acid, and the like, and examples of a glycol component may include one or more of ethylene glycol, diethylene glycol, propylene glycol, butanediol, 1,4-cyclohexanedimethanol, neopentyl glycol, and the like. In either case, as the polyester of the present invention, polyethylene terephthalate, which is typically 60 mol % or greater, preferably 80 mol % or greater of ethylene terephthalate units, is preferred.

In a method for manufacturing a polyester resin molded body of the present invention, a colorant may be additionally added to improve the color of a resin molded body to be manufactured. Examples of the colorant may include a compound containing cobalt such as cobalt acetate, cobalt acetylacetoneate, cobalt benzoylacetonate, cobalt hydroxide, cobalt bromide, cobalt chloride, cobalt iodide, cobalt fluoride, cobalt cyanide, cobalt nitrate, cobalt sulfate, cobalt selenide, cobalt phosphate, cobalt oxide, cobalt thiosianate, cobalt propionate, or the like, but are not limited thereto, and in addition to the cobalt-based inorganic colorant, a non-cobalt-based organic colorant (Blue and Red series) may be used to improve the color.

The colorant may be added such that the content of a cobalt element based on the final polyester resin is about 150 ppm or less, for example, about 10 ppm to about 150 ppm, preferably about 10 ppm to about 100 ppm. A cobalt compound is known to have a certain degree of catalytic activity by itself, but when added in excess to a degree at which a catalytic effect may be exerted, residual metals in polyester may increase, thereby causing toxicity and degrading brightness. Therefore, when added in the above range, adducts such as acetaldehyde and formaldehyde are generated in trace amounts in the polyester, and coloring may be reduced to a minimum. However, in the present invention, in order to provide an eco-friendly polyester molded body, a non-cobalt-based organic colorant was used as a colorant. In the present invention, Clariant's Blue (Polysynthren Blue RLS) and Red (Polysynthren Red GFP) may be used as organic colorants.

The polyester molded body of the present invention may be used as an eco-friendly container which does not affect taste and aroma when used as a food storage container due to reduced contents of acetaldehyde and formaldehyde and which is not toxic to the human body. Specifically, the polyester resin molded body may be used as a beverage bottle, a food packaging material, a fibrous plastic, and the like, and may be preferably used as a beverage bottle.

Another aspect of the present invention relates to a method for manufacturing a polyester molded body. In the method of the present invention, a polyester resin composition composed of polyester prepared using an inorganic tin compound catalyst is melt-extruded to manufacture a molded body.

When preparing a polyester polymer of the polyester resin composition for manufacturing the molded body, an inorganic tin compound is used as a polymerization catalyst to polymerize a dicarboxylic acid component and a glycol component.

The polymerizing of the dicarboxylic acid component and the glycol component may include subjecting the dicarboxylic acid component and the glycol component to an esterification reaction and polycondensing a reactant of the esterification reaction. In the esterification reaction step, after a low polymer is obtained by a transesterification reaction, organic polymer particles and various additives may be added to the low polymer, and then an inorganic tin compound may be added as a polycondensation catalyst to perform a polycondensation reaction, thereby obtaining polyester having a high molecular weight.

More specifically, first, the dicarboxylic acid component and the glycol component are subjected to an ester reaction. According to an embodiment of the present invention, examples of the dicarboxylic acid component may include terephthalic acid, oxalic acid, malonic acid, azelaic acid, fumaric acid, pimelic acid, suberic acid, isophthalic acid, dodecane dicarboxylic acid, naphthalene dicarboxylic acid, biphenyldicarboxylic acid, 1,4-cyclohexane dicarboxylic acid, 1,3-cyclohexane dicarboxylic acid, succinic acid, glutaric acid, adipic acid, sebacic acid, 2,6-naphthalene dicarboxylic acid, 1,2-norbornane dicarboxylic acid, 1,3-cyclohexane dicarboxylic acid, 1,4-cyclohexane dicarboxylic acid, 1,3-cyclobutane dicarboxylic acid, 1,4-cyclohexane dicarboxylic acid, 5-sodium sulfoisophthalic acid, 5-potassium sulfoisophthalic acid, 5-lithium sulfoisophthalic acid, 2-sodium sulfoterephthalic acid, or the like, but are not particularly limited thereto. In addition to the above-described dicarboxylic acids, other dicarboxylic acids not exemplified above may also be used as long as the objects of the present invention are not impaired. According to an embodiment of the present invention, terephthalic acid may be used as the dicarboxylic acid component.

According to an embodiment of the present invention, examples of the glycol component may include ethylene glycol, 1,2-propylene glycol, 1,2-butylene glycol, 1,3-butylene glycol, 2,3-butylene glycol, 1,4-butylene glycol, 1,5-pentanediol, neopentyl glycol, 1,3-propylene glycol, diethylene glycol, triethylene glycol, 1,2-cyclohexane diol, 1,3-cyclohexane diol, 1,4-cyclohexane diol, propane diol, 1,6-hexane diol, neopentyl glycol, tetramethylcyclobutane diol, 1,4-cyclohexane diethanol, 1,10-decamethylene glycol, 1,12-dodecane diol, polyoxyethylene glycol, polyoxymethylene glycol, polyoxytetramethylene glycol, glycerol, or the like, but are not particularly limited thereto, and other glycols may be used as long as the objects of the present invention are not impaired. Preferably, ethylene glycol may be used as the glycol component.

According to an embodiment of the present invention, the esterification reaction of the dicarboxylic acid component and the glycol component may be performed by reacting the dicarboxylic acid component and the glycol component at a temperature of about 200° C. to about 300° C. for about 1 hour to about 6 hours. Thereafter, the reactant of the esterification reaction is polycondensed. The polycondensation of the reactant of the esterification reaction may be performed at a temperature of about 200° C. to about 300° C., and a reduced pressure of about 0.1 torr to about 1 torr for about 1 hour to about 3 hours.

The inorganic tin compound catalyst of the present invention may be introduced when preparing a slurry before the esterification reaction, during the esterification reaction, or before the polycondensation step after the esterification reaction. However, when the inorganic tin compound catalyst of the present invention is introduced during the esterification reaction, there is an effect of improving the esterification reaction, but there may be problems in that the effect of improving the polycondensation time is poor and the content of diethylene glycol (DEG), which is a side reactant, may slightly increase during the esterification reaction, so that in the present invention, it is preferable to introduce the inorganic tin compound catalyst in the polycondensation step of the reactant after the esterification reaction. In this way, compared to a case of using a typical catalyst, the polycondensation time may be significantly shortened, thereby improving productivity.

In the present invention, in the process of polymerizing a polyester resin for manufacturing a polyester molded body, the inorganic tin compound catalyst may be used in an amount of about 200 ppm or less, for example, about 10 ppm to about 200 ppm, preferably about 10 ppm to about 100 ppm, based on the content of a tin a resin polymerization process the inorganic tin compound catalyst with respect to the weight of polyester finally produced. In the present invention, in a polycondensation reaction of polyester, when the amount of the inorganic tin compound catalyst is less than 10 ppm, the polymerization reaction rate decreases, thereby degrading polymerization efficiency, and when greater than 200 ppm, more than enough amount of the inorganic tin compound may act as a foreign substance, so that the workability of a molding process may be degraded.

The content of a tin element in the polyester molded body is preferably 200 ppm or less, more preferably 10 ppm to 100 ppm. When the content of the tin element is greater than 200 ppm, oligomers are by-produced in the process of melt-extruding polyester, so that a molded body which is a low-oligomer and which has high transparency may not be obtained.

According to the present invention, by using an inorganic tin compound, a polycondensation reaction may be performed even with a small amount of a catalyst. In addition, a product of high viscosity may be obtained with a short reaction time. Since the amount of a catalyst used may be decreased as described above, the grayish phenomenon of a polyester polymer produced after polymerization may be reduced and the viscosity, which is typically low, may be increased, which is very industrially advantageous. The polyester molded body according to the present invention is characterized by having a color-L value superior to that of polyester molded bodies manufactured using other types of metal catalysts.

In the present invention, the polyester resin for manufacturing the polyester molded body has an intrinsic viscosity in the range of 0.70 dl/g to about 1.3 dl/g in order to secure suitable physical properties and moldability of the molded article, and more preferably an intrinsic viscosity of 0.70 dl/g to 0.85 dl/g. When the intrinsic viscosity of the polyester is less than 0.70 dl/g, the tensile strength of the polyester molded body may be degraded. On the contrary, when the intrinsic viscosity of the polyester is greater than 1.3 dl/g, productivity may be degraded when manufacturing the polyester molded body. Units of intrinsic viscosity are all in dl/g, and the intrinsic viscosity of a 60/40 (weight ratio) phenol/1,1,2,2-ethane tetrachloride solution of a PET-based resin having a concentration of 0.5 wt % at 30° C. was measured according to ASTM D4603-96.

The polyester resin prepared by a polymerizer of the present invention may be solidified into pellets and then re-melted to be used for molding, or transferred to a molding machine in a molten state without being solidified and used for molding. Here, the molten state refers to a state in which a resin is melted and flows by applying heat to the resin, and the resin in the molten state generally has a viscosity of 500,000 Pa·s or less.

In the present invention, when manufacturing the polyester molded body, a polyester resin composition containing polyester prepared using an inorganic tin compound catalyst is first melted, and then the molten polyester resin composition is filled in a mold, and the polyester resin composition filled in the mold is cooled and then released.

In the present invention, the molding step of the polyester molded body may be performed by compression molding, transfer molding, lamination molding, injection molding, extrusion molding, blow molding, calendar molding, gas molding, insert molding, or vacuum molding. Any method or apparatus may be used without particular limitation in the molding step as long as it is known to be used in the manufacturing of a plastic molded article. For example, when manufacturing a plastic beverage bottle from the prepared polyester resin, a method of blow molding may be used.

The molding of the polyester resin may further include forming a preform of a resin molded body using the prepared polyester resin. In the step of forming the preform of the resin molded body, the prepared polyester resin is dried to remove moisture, and the polyester resin from which moisture is removed may be injected or extruded to be manufactured into a preform suitable for a final product. Then, by applying the preform to the above-described molding method, the final product may be provided.

In the present invention, the polyester resin prepared using the inorganic tin compound catalyst may contain less than 3 ppm of an aldehyde-based compound. More preferably, the polyester resin may contain as low as less than 2 ppm of acetaldehyde and less than 1 ppm of formaldehyde based on the weight of the polyester resin.

The polyester molded body of the present invention may be an eco-friendly container which does not affect taste and aroma when used as a food storage container due to reduced contents of acetaldehyde and formaldehyde and which is not toxic to the human body. Specific examples thereof may include a beverage bottle, a food packaging material, a fibrous plastic, and the like.

Hereinafter, the present invention will be described in more detail with reference to examples according to the present invention. However, the embodiments are only presented as examples of the invention, and the scope of the present invention is not limited thereby.

EXAMPLES

Example 1

Preparation of Catalyst Solution 5 g of an inorganic tin compound catalyst shown in Table 2 below was diluted in ethylene glycol to a total weight of 2 kg, and stirred at a stirring speed of 400 rpm to prepare an inorganic tin compound catalyst at a concentration of 0.25% in ethylene glycol. Thereafter, the inorganic tin compound catalyst was reacted in a refluxable reactor at a reaction temperature of 160° C. to 180° C. for 2 hours to prepare an inorganic tin compound catalyst solution.

Preparation of Polyester Resin 7.8 kg of terephthalic acid (TPA) and 3.3 kg of ethylene glycol (EG) were prepared as a slurry (EG/TPA molar ratio=1.13) and introduced into an esterification reactor in a semi-batch manner to be reacted until the reaction temperature reached 265° C. in an atmospheric pressure reaction under a nitrogen atmosphere so as to prepare a polyester oligomer. At this time, the esterification reaction temperature, a temperature at which the slurry was introduced, was 253° C., and the final esterification reaction end temperature was 265° C., and the reaction time was about 3 hours and 30 minutes. The PET oligomer prepared in the esterification reactor was transferred to a polycondensation reactor, and 200 ppm of a tin oxide catalyst based on the finally obtained PET was added thereto, and a polycondensation reaction was performed thereon under high-vacuum reduced pressure for about 2 hours and 30 minutes until the reaction temperature reached 288° C. to produce a raw chip. Thereafter, the raw chip was solid-phase polymerized to have an intrinsic viscosity of 0.76 dl/g at a temperature of about 250° C. and under vacuum.

Manufacturing of Polyester Molded Body

Using a bottle manufacturing machine (model: Erontier), a prepared preform was put into the machine in which the temperature applied to the preform was fixed at 70° C. to 80° C., and the pressure applied thereto was fixed at a certain level of nitrogen pressure (5 to 8 kgf/cm$^2$), and the preform was automatically rotated along a lane to be heated. At this time, the preform was rotated at a speed of 8.4 seconds, and three stages of air pressure (first: 11 kgf/cm$^2$, second: 40 kgf/cm$^2$, third: 7 kgf/cm$^2$) was applied to the preform in a mold. In the mold, a bottle was manufactured by determining the thickness of the bottom of the bottle by the pressure applied to the preform, and by determining the thickness of the entire surface of the bottle by the intensity of air simultaneously blown.

Examples 2 to 50

A polyester molded body was manufactured in the same manner as in Example 1, except that a polyester chip produced using the inorganic tin compound shown in Table 2 below as a catalyst was used.

Comparative Example 1

A polyester molded body was manufactured in the same manner as in Example 1, except that a catalyst was not used.

Comparative Example 2

[0075]40 g of antimony was dissolved in ethylene glycol to a total weight of 2 kg, and stirred at 400 rpm to prepare a catalyst solution. In a refluxable reactor, the catalyst solution was reacted at a reaction temperature of 180° C. to 190° C. for 2 hours to prepare an antimony glycolate solution. A polyester molded body was manufactured in the same manner as in Example 1, except that polyester polymerized using the obtained antimony catalyst solution was used.

Comparative Examples 2 to 9

A polyester molded body was manufactured in the same manner as in Example 1, except that a polyester polymer prepared using the antimony catalyst shown in Table 1 below as a catalyst was used.

Comparative Example 10

40 g of a titanium compound was dissolved in ethylene glycol to a total weight of 2 kg, and stirred at 400 rpm to prepare a catalyst solution. In a refluxable reactor, the catalyst solution was reacted at a reaction temperature of 180° C. to 190° C. for 2 hours to prepare an titanium glycolate solution. A polyester molded body was manufactured in the same manner as in Example 1, except that polyester polymerized using the obtained titanium catalyst solution was used.

Comparative Examples 11 to 17

A polyester molded body was manufactured in the same manner as in Example 1, except that a polyester polymer prepared using the titanium compound catalyst shown in Table 1 below as a catalyst was used.

Comparative Examples 18 to 47

A polyester molded body was manufactured in the same manner as in Example 1, except that a polyester polymer, which was prepared using 1 ppm, 8 ppm, or 500 ppm of each of the inorganic tin compounds shown in Table 2 below as a catalyst, was used.

Test Example

Physical properties of each of the polyester molded body manufactured according to Examples 1 to 50 and Comparative Examples 1 to 47 were evaluated by the following method, and the results are shown in Table 1 and Table 2 below.

(1) Intrinsic Viscosity

In accordance with ASTM D 4603, 0.1 g of a sample was dissolved for 90 minutes in a reagent (Raw Chip 90° C., SSP 130° C.), in which phenol and 1,1,2,2-tetrachloroethane were mixed in a weight ratio of 6:4, until the concentration reached 0.4 g/100 mℓ, and then transferred into a Ubbelohde viscometer and remained in a thermostat of 30° C. for 10 minutes, and the number of drop seconds of the solution was obtained using the viscometer and an aspirator. The number of drop seconds of the solvent were obtained in the same manner, and then the R.V. (relative viscosity) value and I.V. (intrinsic viscosity) value were calculated by Equations 1 and 2.

R.V.=Number of drop seconds of sample/number of drop seconds of solvent <Equation 1>

$$I.V.=\frac{1}{4}\times[(R.V.-1)/C]+\frac{3}{4}\times(\ln R.V./C)$$ <Equation 2>

In Equation above, C represents the concentration (g/100 mℓ) of the sample in the solution.

(2) Concentration of Carboxyl Terminal Group (CEG)

In accordance with ASTM D 7409, the sample was dissolved using O-cresol and then analyzed using acid-base neutralization titration. Specifically, about 0.2 g of a sample was taken and 10 mℓ of benzyl alcohol was added thereto. The mixture was dissolved by being heated for 10 minutes in a heating block of 200° C., and then cooled in a water bath for 1 minute. Then, 10 mℓ of chloroform, phenol red, and a few drops of phenolphthalein indicator are added thereto, and the mixture was titrated using 0.02 N KOH (or NaOH). Using an appropriate amount thereof, the concentration of a carboxyl terminal group (CEG) was calculated by Equation 3. The number of carboxyl groups is represented by milliequivalents of carboxyl groups/kg of polymer (meq/kg).

$$CEG=(A-B)\times0.02\times1000/W$$ <Equation 3>

A: mℓ consumed in sample, B: blank, W: weight of sample (3) Acetaldehyde (A.A.) Content (Ppm) of Polymer In accordance with ASTM F 2013, a frozen-crushed polyester sample was put into a headspace sampler vial, sealed, and then heat-extracted at 160° C. for 2 hours to be analyzed by gas chromatography GC (Agilent 7890).

(4) Color Measurement (Color L)

Using a colorimeter (Color view-9000, a product of BYK Gardner), the Color L value was measured under the condition of D65 light source and 10°. The L value measured by a spectrophotometer is a colorimetric value calculated from the CIE 1976 CIE Lab chrominance equation after measuring the reflectance of the sample.

(5) Analysis of Acetaldehyde (A.A) Content (Ppb) of Bottled Water in Molded Body Drinking water was put into a polyester molded article to be measured, and a trace amount (ppb level) content of acetaldehyde in the drinking water was analyzed using HPLC/UV-VIS through 2,4-dinitrophenyl hydrazine (DNPH) derivatization.

A DNPH derivatization solution was prepared with 0.2 g of 2,4-dinitrophenyl hydrazine/100 mℓ of acetonitrile, and the derivatization reaction procedure was performed by taking 2 mℓ of a sample of a solution to be measured in 4 mℓ of a vial, and then adding 100 μL of the DNPH derivatization solution thereto, followed by stirring. After the measurement sample was stirred, 100 μL of 45% $H_3PO_4$ was added thereto, followed by applying ultrasonication for 30 minutes to derivatize the sample. The derivatized sample solution was analyzed and evaluated using HPLC/UV-VIS (Waters LC Module 1 plus). A column used for the analysis was Kromasil KR100-10C18 (25 cm*4.6 mm), and the solvent condition for using the instrument was CH3CN/Water=2/1.

A UV-VIS detection wavelength was evaluated at 356 nm to measure the acetaldehyde content of the measurement target.

TABLE 1

| Catalyst category | | | Content (ppm) | IV (dl/g) | CEG (meq/kg) | Color L | A.A. of polymer (ppm) | A.A. in drinking water in container (ppb) |
|---|---|---|---|---|---|---|---|---|
| Catalyst not used | | Comparative Example 1 | 0 | 0.389 | 40 | 80.2 | 10.1 | 1033.5 |
| Antimony compound | Antimony triglycolate (P) | Comparative Example 2 | 500 | 0.771 | 20 | 87.1 | 1.9 | 10.8 |
| | | Comparative Example 3 | 200 | 0.767 | 16 | 88.3 | 0.6 | 1.5 |
| | | Comparative Example 4 | 100 | 0.715 | 29 | 88.1 | 1.9 | 3.8 |
| | | Comparative Example 5 | 40 | 0.687 | 29 | 89.4 | 5.6 | 35.1 |
| | | Comparative Example 6 | 20 | 0.599 | 35 | 87.5 | 9.9 | 594.7 |
| | | Comparative Example 7 | 10 | 0.601 | 35 | 85.6 | 8.6 | 429.5 |
| | | Comparative Example 8 | 8 | 0.458 | 28 | 81.5 | 8.4 | 892.0 |

TABLE 1-continued

| Catalyst category | | | Content (ppm) | IV (dl/g) | CEG (meq/kg) | Color L | A.A. of polymer (ppm) | A.A. in drinking water in container (ppb) |
|---|---|---|---|---|---|---|---|---|
| | | Comparative Example 9 | 1 | 0.378 | 39 | 81.1 | 6.6 | 955.6 |
| Titanium compound | Titanium butoxide (L) | Comparative Example 10 | 500 | 0.765 | 29 | 81.5 | 11.5 | 986.3 |
| | | Comparative Example 11 | 200 | 0.761 | 28 | 83.6 | 10.6 | 812.4 |
| | | Comparative Example 12 | 100 | 0.763 | 29 | 87.9 | 6.1 | 315.6 |
| | | Comparative Example 13 | 40 | 0.750 | 25 | 89.4 | 2.9 | 114.5 |
| | | Comparative Example 14 | 20 | 0.760 | 25 | 90.1 | 1.8 | 84.3 |
| | | Comparative Example 15 | 10 | 0.759 | 25 | 90.9 | 0.6 | 21.4 |
| | | Comparative Example 16 | 8 | 0.759 | 24 | 88.7 | 0.9 | 18.7 |
| | | Comparative Example 17 | 1 | 0.509 | 33 | 82.6 | 4.3 | 264.4 |

TABLE 2

| Catalyst category | | | Content | IV (dl/g) | CEG (meq/kg) | Color L | A.A. of polymer (ppm) | A.A. of solution (ppb) |
|---|---|---|---|---|---|---|---|---|
| Inorganic tin first compound (stannous tin compound) | Tin oxide (P) | Comparative Example 18 | 500 | 0.760 | 22 | 88.1 | 9.7 | 789.1 |
| | | Example 1 | 200 | 0.760 | 21 | 88.6 | 2.9 | 97.4 |
| | | Example 2 | 100 | 0.763 | 22 | 89.3 | 1.8 | 32.1 |
| | | Example 3 | 40 | 0.764 | 18 | 92.1 | 0.4 | 1.0 |
| | | Example 4 | 20 | 0.759 | 17 | 91.9 | 0.5 | 0.6 |
| | | Example 5 | 10 | 0.759 | 18 | 92.5 | 0.4 | 0.9 |
| | | Comparative Example 19 | 8 | 0.760 | 20 | 91.0 | 3.1 | 35.4 |
| | | Comparative Example 20 | 1 | 0.516 | 30 | 81.5 | 10.5 | 876.3 |
| | Tin acetate (P) | Comparative Example 21 | 500 | 0.765 | 21 | 88.7 | 8.4 | 687.4 |
| | | Example 6 | 200 | 0.760 | 22 | 88.6 | 2.1 | 84.5 |
| | | Example 7 | 100 | 0.755 | 21 | 89.6 | 1.7 | 22.1 |
| | | Example 8 | 40 | 0.760 | 18 | 91.1 | 0.6 | 0.9 |
| | | Example 9 | 20 | 0.762 | 17 | 92.3 | 0.9 | 0.5 |
| | | Example 10 | 10 | 0.757 | 19 | 92.0 | 0.4 | 0.6 |
| | | Comparative Example 22 | 8 | 0.754 | 21 | 89.1 | 3.6 | 25.4 |
| | | Comparative Example 23 | 1 | 0.521 | 33 | 82.5 | 9.4 | 676.3 |
| | Tin oxalate (P) | Comparative Example 24 | 500 | 0.760 | 22 | 86.7 | 8.4 | 512.4 |
| | | Example 11 | 200 | 0.762 | 20 | 88.1 | 2.8 | 51.5 |
| | | Example 12 | 100 | 0.763 | 22 | 89.2 | 1.4 | 11.1 |
| | | Example 13 | 40 | 0.766 | 19 | 91.9 | 0.3 | 0.3 |
| | | Example 14 | 20 | 0.764 | 19 | 92.6 | 0.4 | 0.5 |
| | | Example 15 | 10 | 0.757 | 18 | 92.6 | 0.3 | 0.4 |
| | | Comparative Example 25 | 8 | 0.752 | 22 | 89.1 | 3.0 | 25.4 |
| | | Comparative Example 26 | 1 | 0.545 | 35 | 83.5 | 7.4 | 456.3 |
| | Tin stearate (P) | Comparative Example 27 | 500 | 0.759 | 23 | 87.7 | 11.4 | 997.4 |
| | | Example 16 | 200 | 0.766 | 25 | 88.1 | 3.0 | 362.5 |
| | | Example 17 | 100 | 0.760 | 22 | 89.2 | 1.4 | 12.1 |
| | | Example 18 | 40 | 0.763 | 19 | 90.9 | 0.7 | 1.5 |
| | | Example 19 | 20 | 0.760 | 20 | 91.8 | 1.2 | 1.0 |
| | | Example 20 | 10 | 0.759 | 20 | 92.5 | 0.6 | 0.4 |
| | | Comparative Example 28 | 8 | 0.752 | 22 | 89.0 | 3.0 | 129.9 |
| | | Comparative Example 29 | 1 | 0.549 | 35 | 84.9 | 6.7 | 608.3 |
| | Tin glycolate (P, L) | Comparative Example 30 | 500 | 0.760 | 20 | 88.7 | 8.3 | 768.4 |
| | | Example 21 | 200 | 0.760 | 20 | 89.9 | 2.4 | 124.5 |
| | | Example 22 | 100 | 0.764 | 19 | 90.6 | 0.9 | 3.1 |
| | | Example 23 | 40 | 0.760 | 19 | 91.9 | 0.4 | 1.1 |
| | | Example 24 | 20 | 0.762 | 18 | 92.5 | 0.5 | 1.9 |
| | | Example 25 | 10 | 0.762 | 18 | 92.9 | 0.3 | 0.6 |
| | | Comparative Example 31 | 8 | 0.760 | 20 | 89.7 | 3.1 | 229.9 |
| | | Comparative Example 32 | 1 | 0.561 | 34 | 85.9 | 5.1 | 708.3 |
| Inorganic tin second compound (stannic tin compound) | Tin oxide (P) | Comparative Example 33 | 500 | 0.755 | 24 | 89.1 | 14.1 | 1156.9 |
| | | Example 26 | 200 | 0.759 | 26 | 88.4 | 3.0 | 125.4 |
| | | Example 27 | 100 | 0.760 | 23 | 89.3 | 2.0 | 11.2 |
| | | Example 28 | 40 | 0.764 | 21 | 90.1 | 1.1 | 4.5 |
| | | Example 29 | 20 | 0.761 | 22 | 90.7 | 1.2 | 2.1 |
| | | Example 30 | 10 | 0.758 | 23 | 91.5 | 1.0 | 1.1 |
| | | Comparative Example 34 | 8 | 0.759 | 22 | 91.4 | 3.4 | 65.4 |
| | | Comparative Example 35 | 1 | 0.511 | 34 | 84.5 | 9.4 | 900.3 |
| | Tin acetate (P) | Comparative Example 36 | 500 | 0.761 | 23 | 88.4 | 10.1 | 756.9 |
| | | Example 31 | 200 | 0.766 | 22 | 89.1 | 2.4 | 96.4 |
| | | Example 32 | 100 | 0.761 | 22 | 90.3 | 2.0 | 20.2 |
| | | Example 33 | 40 | 0.765 | 20 | 90.7 | 1.3 | 11.5 |
| | | Example 34 | 20 | 0.765 | 21 | 90.8 | 0.9 | 1.1 |
| | | Example 35 | 10 | 0.761 | 23 | 91.2 | 0.9 | 0.9 |
| | | Comparative Example 37 | 8 | 0.759 | 23 | 91.0 | 3.3 | 155.4 |
| | | Comparative | 1 | 0.487 | 37 | 83.5 | 4.8 | 300.3 |

TABLE 2-continued

| Catalyst category | | Content | IV (dl/g) | CEG (meq/kg) | Color L | A.A. of polymer (ppm) | A.A. of solution (ppb) |
|---|---|---|---|---|---|---|---|
| | Example 38 | | | | | | |
| Tin oxalate (P) | Comparative Example 39 | 500 | 0.761 | 32 | 85.7 | 10.0 | 1112.4 |
| | Example 36 | 200 | 0.760 | 24 | 89.1 | 2.6 | 41.5 |
| | Example 37 | 100 | 0.759 | 24 | 89.4 | 1.3 | 10.1 |
| | Example 38 | 40 | 0.757 | 22 | 90.9 | 0.5 | 1.9 |
| | Example 39 | 20 | 0.763 | 21 | 91.6 | 0.5 | 1.6 |
| | Example 40 | 10 | 0.760 | 23 | 91.9 | 0.8 | 2.1 |
| | Comparative Example 40 | 8 | 0.760 | 22 | 90.1 | 3.4 | 175.5 |
| | Comparative Example 41 | 1 | 0.459 | 35 | 81.5 | 8.6 | 861.3 |
| Tin stearate (P) | Comparative Example 42 | 500 | 0.766 | 33 | 88.7 | 9.4 | 699.4 |
| | Example 41 | 200 | 0.761 | 35 | 88.9 | 2.8 | 198.5 |
| | Example 42 | 100 | 0.760 | 32 | 89.3 | 1.9 | 11.1 |
| | Example 43 | 40 | 0.763 | 29 | 90.2 | 1.1 | 4.5 |
| | Example 44 | 20 | 0.759 | 25 | 91.0 | 0.5 | 0.9 |
| | Example 45 | 10 | 0.761 | 24 | 92.1 | 0.4 | 1.1 |
| | Comparative Example 43 | 8 | 0.755 | 26 | 89.9 | 3.1 | 331.1 |
| | Comparative Example 44 | 1 | 0.449 | 35 | 82.3 | 5.9 | 612.3 |
| Tin glycolate (P, L) | Comparative Example 45 | 500 | 0.761 | 30 | 87.7 | 7.3 | 568.4 |
| | Example 46 | 200 | 0.762 | 25 | 88.9 | 2.8 | 224.5 |
| | Example 47 | 100 | 0.759 | 23 | 90.1 | 0.9 | 5.1 |
| | Example 48 | 40 | 0.763 | 22 | 91.0 | 0.6 | 1.9 |
| | Example 49 | 20 | 0.765 | 24 | 92.1 | 0.8 | 1.4 |
| | Example 50 | 10 | 0.760 | 22 | 91.9 | 0.5 | 0.9 |
| | Comparative Example 46 | 8 | 0.758 | 24 | 90.0 | 3.4 | 209.6 |
| | Comparative Example 47 | 1 | 0.501 | 34 | 84.4 | 6.4 | 654.1 |

Referring to Table 1 and Table 2 above, it can be confirmed that the polyester containers manufactured in Examples 1 to 50 have physical properties which are equal to or greater than those of Comparative Examples 2 to 7 in which a polyester resin using an antimony catalyst was used. In addition, in the case of the polyester containers manufactured in Examples 1 to 50, it was confirmed that the content of acetaldehyde in the drinking water contained in the containers was significantly reduced, and the color was good. Accordingly, it can be confirmed that it is possible to manufacture an eco-friendly container which does not affect the taste and aroma of a beverage and which is not toxic to the human body since the polyester resin molded bodies of Examples contain a trace amount of acetaldehyde. In contrast, in the bottles of Comparative Examples 1 to 47, a relatively large amount of acetaldehyde was detected in the drinking water contained in the containers, so that the use of the bottle as a food storage container would be harmful to both the environment and the human body, and it was confirmed that the color was bad.

Although the present invention has been described above with reference to limited embodiments, the present invention is not limited thereto, and various modifications and variations may be made to the technical spirit of the present invention by those skilled in the art to which the present invention belongs. Therefore, the true scope of protection of the present invention should be determined by the claims described below and the scope equivalent thereto.

The invention claimed is:

1. A polyester molded body molded with polyester prepared using a stannous tin compound as a polymerization catalyst, wherein the polyester molded body comprises a residue of the stannous tin compound in an amount of 10 ppm to 200 ppm, and wherein the stannous tin compound is selected from the group consisting of stannous pyrophosphate, stannous phosphate, stannous tartrate, stannous stearate, stannous oleate, stannous gluconate, and stannous citrate.

2. The polyester molded body of claim 1, wherein the polyester is one or more selected from the group consisting of polyethylene terephthalate, polytrimethylene terephthalate and polytetramethylene terephthalate.

3. A method for manufacturing a polyester molded body, the method comprising:

melting and molding a polyester resin composition composed of polyester prepared using a stannous tin compound as a polymerization catalyst, wherein the polyester molded body comprises a residue of the stannous tin compound in an amount of 10 ppm to 200 ppm, and wherein the stannous tin compound is selected from the group consisting of stannous pyrophosphate, stannous phosphate, stannous tartrate, stannous stearate, stannous oleate, stannous gluconate, and stannous citrate.

4. The method of claim 3, wherein the method comprises:

melting the polyester resin composition;

filling the melted polyester resin composition in a mold; and cooling and releasing the polyester resin composition filled in the mold.

5. The method of claim 3, wherein, when polymerizing the polyester, 10 ppm to 200 ppm of the stannous tin compound is added to the polyester.

6. The method of claim 3, wherein the molding is performed by compression molding, transfer molding, lamination molding, injection molding, extrusion molding, blow molding, calendar molding, gas molding, insert molding, or vacuum molding.

* * * * *